United States Patent [19]

Keske et al.

[11] 4,447,574

[45] May 8, 1984

[54] INJECTION MOLDABLE AMIDE-IMIDE POLYMERS CONTAINING CALCIUM MOIETIES

[75] Inventors: Robert G. Keske; Gary T. Brooks, both of Naperville; Ronald E. Bockrath, Oswego, all of Ill.

[73] Assignee: Standard Oil Company (Indiana), Chicago, Ill.

[21] Appl. No.: 393,436

[22] Filed: Jun. 29, 1982

[51] Int. Cl.$^3$ .................. C08G 69/26; C08K 3/22; C08K 3/24

[52] U.S. Cl. .................. 524/400; 260/DIG. 35; 524/433; 524/436; 524/600; 524/777; 524/779; 528/188

[58] Field of Search ............ 524/400, 433, 436, 777, 524/779, 600; 528/188; 260/DIG. 35

[56] References Cited

U.S. PATENT DOCUMENTS

| | | | |
|---|---|---|---|
| 3,396,128 | 8/1968 | Matumoto et al. | 524/400 |
| 3,494,890 | 2/1970 | Morello | 528/179 |
| 4,016,140 | 4/1977 | Morello | 528/188 |
| 4,145,478 | 3/1979 | Beauchamp | 524/433 |
| 4,229,332 | 10/1980 | Kyo et al. | 524/400 |
| 4,237,034 | 12/1980 | Tomka et al. | 524/400 |
| 4,284,540 | 8/1981 | Iida et al. | 524/400 |
| 4,291,149 | 9/1981 | Keske et al. | 528/188 |
| 4,309,528 | 1/1982 | Keske et al. | 528/188 |
| 4,321,357 | 3/1982 | Keske et al. | 528/188 |
| 4,377,652 | 3/1983 | Ohmura et al. | 524/433 |

*Primary Examiner*—Ronald W. Griffin
*Attorney, Agent, or Firm*—Gunar J. Blumberg; William T. McClain; William H. Magidson

[57] ABSTRACT

Injection moldable homopolymers, copolymers, and terpolymers are prepared from fully or partially acylated aromatic diamines, aliphatic diamines or a mixture of these and aromatic tricarboxylic anhydride compounds or mixtures of tricarboxylic anhydrides and dicarboxylic acids. These polymers are improved by the addition of calcium moieties such as oxide, calcium acetate and calcium hydroxide. These polymers are useful for the preparation of injection molded articles.

15 Claims, No Drawings

INJECTION MOLDABLE AMIDE-IMIDE POLYMERS CONTAINING CALCIUM MOIETIES

BACKGROUND OF THE INVENTION

1. Field of the Invention

The field of the invention relates to improved injection moldable amide-imide polymers, where heat deflection temperature has been increased and shrinkage during annealing has been reduced by the addition of calcium moieties such as calcium acetate, calcium salts such as calcium oxide or calcium hydroxide.

2. Background

Amide-imide and polyamide polymers and copolymers are a relatively new class of organic compounds known for their solubility in nitrogen containing solvents when in the polyamic acid form. The major application of these amide-imides has been as wire enamels and film formers. Polyimide and polyamide-imide polymers have also been found useful for molding applications as shown in U.S. Pat. Nos. 4,309,528 (1982) and 4,291,149 (1981).

The general object of this invention is to provide injection moldable amide-imide polymers having improved heat deflection temperatures and reduced shrinkage during annealing. A more specific object of this invention is to provide a novel process for the manufacture of injection moldable amide-imide and amide polymers by reacting fully or partially acylated diamines with aromatic tricarboxylic acid anhydrides or mixtures of aromatic dicarboxylic acids and aromatic tricarboxylic acid anhydrides including calcium salts and calcium oxides. Another object is to provide novel polyamide-imide copolymers suitable for use as an engineering plastic particularly for and in injection molding. Other objects appear hereinafter.

We have discovered an improved melt condensation process in which fully or partially acylated diamines are reacted with aromatic tricarboxylic anhydrides or mixtures of aromatic tricarboxylic anhydrides with aromatic dicarboxylic acids to yield engineering plastics suitable for injection molding which feature very high tensile strength and heat distortion temperatures. Our novel process for the preparation of random linear injection moldable amide-imide and amide copolymers comprises adding calcium salts or calcium oxide either to the trimellitic anhydride moiety prior to reaction with the diamines or adding these salts or oxides to the polyamide-imide after the reaction.

In our process fully or partially acylated diamines with aromatic tricarboxylic acid anhydrides or mixtures of aromatic tricarboxylic acid anhydrides with aromatic dicarboxylic acids are reacted in a molar ratio of about 0.9:1.0 to about 1.1:1.0 at a temperature of about 50 to about 725° F. About 0.05 to 3 weight percent of calcium oxides or calcium compounds excluding calcium halides or sulfides are incorporated into the polymer during the reaction or after it. By incorporating the calcium oxide, acetate or hydroxide in the polyamide-imide polymers we increase dramatically the heat deflection temperature as shown in the Tables and also reduce the polymer shrinkage during the annealing cycle.

The polymer produced according to the novel process utilizing partially or fully acylated diamines is essentially soluble with inherent viscosities in the range of 0.3 to 3.0. For the purpose of this invention, inherent viscosity is measured at 25° C. and 0.5 percent w/v in 100 percent sulfuric acid or N-methylpyrrolidone.

The novel injection moldable amorphous random linear polyamide-imide polymers of this invention comprise units of

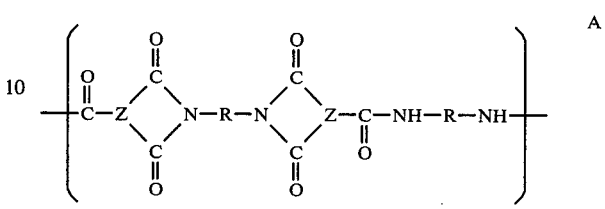

and units of:

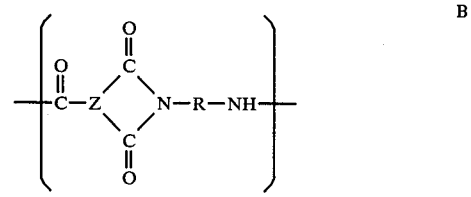

R comprises $R_1$ and $R_2$, $R_1$ and $R_2$ are aromatic hydrocarbon radicals of from 6 to about 20 carbon atoms or two divalent hydrocarbon radicals of from 6 to 20 carbon atoms joined directly or by stable linkages selected from the group consisting of —O—, methylene, —CO—, —SO$_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

The novel injection moldable random linear copolymer may comprise structural Units A and B and also include Unit C of the following formula:

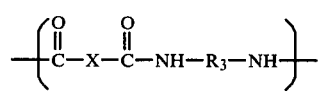

wherein X is a divalent aromatic radical usually a divalent benzene radical and $R_3$ comprises both $R_1$ and $R_2$ as defined above or is equal to $R_1$. Furthermore, if structure C is present R of structural Units A and B can be equal to $R_1$ or comprise both $R_1$ and $R_2$ as set forth above.

In the foregoing structural units Z is a trivalent aromatic radical. Z may be a trivalent radical of benzene, naphthalene, biphenyl, diphenyl ether, diphenyl sulfide, diphenyl sulfone, ditolyl ether, and the like.

Useful aromatic tricarboxylic acid anhydrides which contribute the trivalent radical moiety of Z include those compounds containing at least one pair of carboxyl groups in the ortho position with respect to each other or otherwise situated in a fashion which permits the formation of an anhydride structure, one other carboxyl group and from 9 to 21 carbon atoms. Within these limits, these compounds may contain one or more benzenoid rings such as, for instance, trimellitic anhydride and its isomers and multi-ring compounds such as the 1,8-anhydride of 1,3,8-tricarboxylnaphthalene. Usually these compounds contain up to three benzenoid rings.

The aromatic tricarboxylic acid anhydride used in the novel process to form the polyamide-imide polymers of this invention is of the formula:

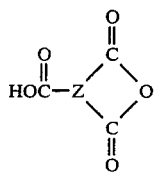

where Z is a trivalent aromatic radical defined as set forth hereinabove. The following aromatic tricarboxylic anhydrides are preferred: trimellitic acid anhydride; 2,3,6-naphthalene tricarboxylic anhydride; 1,5,6-naphthalene tricarboxylic anhydride, and the like; 2,6-dichloronaphthalene-4,5,7-tricarboxylic anhydride, and the like. One of the preferred aromatic tricarboxylic anhydrides is trimellitic anhydride since this compound is readily available and forms polymers having excellent physical properties of tensile strength and elongation and is resistant to high temperatures.

Suitable fully or partially acylated diamines useful in applicant's process include para- and metaphenylenediamine, oxybisaniline, thiobisaniline, sulfonylbisaniline, diaminobenzophenone, methylenebisaniline, benzidine, 1,5-diaminonaphthalene, oxybis-2-methylaniline, thiobis-2-methylaniline, and the like. Examples of other useful aromatic primary diamines are set out in U.S. Pat. No. 3,494,890 (1970) and U.S. Pat. No. 4,106,140 (1977) both incorporated herein by reference.

Useful aromatic dicarboxylic acids include isophthalic acid and terephthalic acid. In applicant's process further preparation of injection moldable amide-imide and amide copolymers process can be conducted without utilizing a solvent or fluidizing agent though it is preferred to use agents such as N-methylpyrrolidone, dimethylacetamide, or acetic acid for the initial mixing of reactants. In general, since these polymers are linear, they may be easily cured in the melt using a twin screw extruder as the finishing reactor instead of a solid state polymerization. However, in some instances, it may be helpful to solid state polymerize the copolymers. The term "solid state polymerization" refers to chain extension of polymer molecules under conditions where the polymer particles contain their solid form and do not become a fluid mass.

The solid state polymerizing can be carried out below the melting point of the polymer and can be conducted in several ways. However, all the techniques require heating the ground or pelletized copolymer below the copolymer melting point, generally of about 400° to 600° F. while either sparging with an inert gas such as nitrogen or air or operating under vacuum.

Injection molding of the polymer is accomplished by injecting the copolymer into a mold maintained at a temperature of about 350°–500° F. In this process a 0.1–2.0 minutes cycle is used with a barrel temperature of about 500° F. to 700° F. The injection molding conditions are given in Table I.

TABLE I

| | |
|---|---|
| Mold Temperature | 350–500° F. |
| Injection Pressure | 2,000–40,000 psi and held for 0.5–20 seconds |
| Back Pressure | 0–400 psi |
| Cycle Time | 6–120 seconds |
| Extruder | |

TABLE I-continued

| | |
|---|---|
| Nozzle Temperature Barrels | 500° F. to 700° F. |
| Front heated to Screw | 500° F. to 700° F. 10–200 revolutions/minute |

The mechanical properties of the polymers prepared in the Examples are given in Tables II, III, IV, V, VI and VII.

In applicant's process the acylated aromatic diamines need not be isolated or purified prior to their further reaction with the tricarboxylic acid anhydride or dicarboxylic acid. Therefore, one can react one to two moles of acetic anhydride or acid or propionic anhydride or acid or any other $C_2$ through $C_8$ containing aliphatic anhydride or acid and one mole of the appropriate aromatic diamine or diamine mixture and use the resulting acylated diamine solution in acetic acid or propionic acid to react with the tricarboxylic anhydride compound, or mixtures of the tricarboxylic anhydride compound with dicarboxylic acid.

In most cases, linear high molecular weight polyamide-imide polymers result after melt and/or solid state polymerization.

The following examples illustrate the preferred embodiments of this invention. It will be understood that these examples are for illustrative purposes only and do not purport to be wholly definitive with respect to the conditions or scope of the invention.

The novel process can suitably be conducted as a continuous process, which process comprises reacting fully or partially acylated diamines with aromatic tricarboxylic acid anhydrides or mixtures of aromatic dicarboxylic acids and aromatic tricarboxylic acid anhydrides in a molar ratio of about 1 to 1 at a temperature of about 50° to 725° F. and wherein the molar ratio of the acylated diamines to the anhydride or acid and anhydride mixture is about 1 to 1.

EXAMPLE 1

Control

This example illustrates the continuous melt preparation of 10:6:4 TMA:OBA:MPDA copolymer using 90 percent acylated diamines.

A twenty-five gallon stirred kettle was charged with 8,989 g of oxybisaniline, 3246 g of metaphenylenediamine, and 6 l. (6,300 g) of acetic acid. To this stirred mixture under nitrogen was added 14,000 g of acetic anhydride over a period of 12 minutes while the skin of the jacketed kettle was water cooled. Trimellitic anhydride, 15,027 g was added to the kettle over a period of 5 minutes. This mixture was heated to 220° F. by passing steam through the kettle's jacket. This mixture was continuously metered at a rate of 4,540 g/hr into an electrically heated (top skin temperature 550° F., bottom skin temperature 660° F.) helical anchor stirred reactor. The feed stream into this reactor was maintained at approximately 150 psi and the stream was heated to a temperature of 410°–420° F. The reactor content was maintained at 2,500–3,000 g and a melt temperature of 540°–560° F. Distillate was collected and product was pumped out of the reactor by a gear pump and cooled and ground. The product polymer had an inherent viscosity of 0.24 in N-methylpyrrolidone at 25° C. and 0.5 percent w/v concentration. This polymer mixed with ½ percent by weight polytetrafluoroethylene was fed continuously at a rate of 6 lb/hr to a Werner and Pfleiderer ZSK-30 twin screw reactor containing six temperature zones at 525°, 690°, 670°, 630°, 650°, and 660° F., two vacuum vents at 25.2 in Hg and 29.0 in Hg, and operating at 40 RPM increased the inherent viscosity to about 0.57. Mechanical properties of this polymer are shown in Table II.

TABLE II

|  |  | ASTM Method |
|---|---|---|
| CaO, % | 0 |  |
| $n_{inh}$ (before molding), dl/g | 0.56 |  |
| $n_{inh}$ (after molding), dl/g | 0.54 |  |
| Tensile Strength, psi | 14,800 | D-638 |
| Elongation at Break, % | 5.7 | D-638 |
| Flexural Strength, psi | 26,300 | D-790 |
| Flexural Modulus, psi | 626,000 | D-790 |
| Izod, ft-lb/in. notch | 0.68 | D-256 |
| HDT at 264 psi, °F. | 517 | D-648 |
| Shrinkage$^a$ during annealing, % | 2.4$^b$ |  |

$^a$In length of the D-1708 tensile bar
$^b$Annealing Cycle: 24 hr. at 460, 490, 500, 510, 515° F.

EXAMPLE 2

The polymer was prepared in an identical manner to the one in Example 1 except that 3 weight percent of calcium oxide was dry blended with the polymer prior to injection molding, the results are shown below:

TABLE III

|  |  | ASTM Method |
|---|---|---|
| CaO, % | 3.0 |  |
| $n_{inh}$ (before molding), dl/g | 0.57 |  |
| $n_{inh}$ (after molding), dl/g | 0.72 (gel)$^c$ |  |
| Tensile Strength, psi | 22,600 | D-638 |
| Elongation at Break, % | 11.0 | D-638 |
| Flexural Strength, psi | 30,200 | D-790 |
| Flexural Modulus, psi | 694,000 | D-790 |
| Izod, ft-lb/in. notch | 1.24 | D-256 |
| HDT at 264 psi, °F. | 555 | D-648 |
| Shrinkage$^a$ during annealing, % | 0.24$^b$ |  |

$^a$In length of the D-1708 tensile bar
$^b$Annealing Cycle: 48 hrs. at 500° F., 24 hr. at 520, 24 hr. at 525° F.
$^c$gel = swollen, undissolved polymer particles

EXAMPLE 3

The polymer was prepared similar to that of Example 1 except that slightly higher reactor temperatures were used to obtain a higher inherent viscosity and the polymer from the gear pump was fed directly to the ZSK-30.

EXAMPLES 4 AND 5

These examples are the same as Example 3 except that in Example 4, 1.5 weight percent of calcium oxide was dry blended with the polymer prior to molding and in Example 5, 0.75 weight percent of calcium oxide was dry blended with the polymer prior to molding.

The results are set forth in Table IV.

TABLE IV

| Example | 3 | 4 | 5 | ASTM Method |
|---|---|---|---|---|
| $n_{inh}$ (before molding), dl/g | 0.65 | 0.61 | 0.61 |  |
| $n_{inh}$ (after molding), dl/g | 0.68 | 0.79 (gel) | 0.69 |  |
| CaO, % | — | 1.5 | 0.75 |  |
| Tensile Strength, psi | 22,500 | 24,400 | 25,300 | D-638 |
| Elongation at Break, % | 11.5 | 11.8 | 12.9 | D-638 |
| Flexural Strength, psi | 30,900 | 31,200 | 27,400 | D-790 |
| Flexural Modulus, psi | 617,000 | 672,000 | 611,000 | D-790 |
| Izod, ft-lb/in. notch | 1.87 | 1.13 | 1.21 | D-256 |
| HDT at 264 psi, °F. | 523 | 553 | 545 | D-648 |
| Shrinkage$^a$ during annealing, % | 1.24$^b$ | 0.3$^c$ | 0.4$^c$ |  |

$^a$In length of the D-1708 tensile bar
$^b$Annealing Cycle: 24 hr. at 460, 490, 500, 510, 515° F.
$^c$Annealing Cycle: 24 hr. at 495, 515, 525° F.

EXAMPLE 6

Melt preparation of TMA:OBA:MPDA 10:6:4 copolymer Oxybisaniline (600 g), metaphenylenediamine (216 g) and acetic acid (400 ml) was charged into a five-liter three-necked flask equipped with a metal-blade, metal shaft stirrer, pressure equalizing addition funnel with nitrogen inlet, and a distillation takeoff. After flushing the flask with nitrogen and keeping a slow bleed, acetic anhydride (918 g) was added over five minutes. This was followed by the addition of 960 g of trimellitic anhydride over one minute. The temperature of the bottom half of the spherical heating mantle surrounding the flask was set at 725° F. and the Variac connected to the top half was set at 60. After 80 minutes approximately 1250 ml of distillate was collected, the polymer was briefly held under low vacuum (20 in Hg) and then cooled under nitrogen. Its inherent viscosity (0.5 percent w/v in NMP at 25° C.) was 0.23 dl/g. The polymer was cured under high vacuum (0.5 mm Hg) for 16 hr at 500° F. increasing its inherent viscosity to 0.60. A subsequent solid state polymerization (16 hr, 500° F., 0.5 mm Hg vacuum) increased the inherent viscosity to 0.70. The physical properties are set forth in Table V.

EXAMPLE 7

This preparation is similar to that of Example 6 except that 8.8 g (1 mole percent based on trimellitic anhydride) of calcium acetate monohydrate was added to the mixture of diamines prior to the acetic anhydride addition.

EXAMPLE 8

This preparation is similar to that of Example 7 except that 2 mole percent (17.6 g) of calcium acetate monohydrate was used.

TABLE V

| Polymer of Example | 6 | 7 | 8 | ASTM Method |
|---|---|---|---|---|
| Mole %$^a$ Calcium salt | 0 | 1$^e$ | 2$^e$ |  |
| $n_{inh}$ prior to molding, dl/g | 0.70 | 0.65 | 0.64 |  |
| HDT at 264 psi, °F. | 525–530 | 537 | 541 | D-648 |
| Shrinkage$^b$ during annealing, | 1.0$^c$ | 0.36$^d$ | 0.26$^d$ |  |

TABLE V-continued

| Polymer of Example | 6 | 7 | 8 | ASTM Method |
|---|---|---|---|---|
| % | | | | |

[a] Based on TMA content
[b] Of D1708 tensile bar
[c] Anealing Cycle: 24 hr. at 460, 24 at 490, 24 at 500, 24 at 510, 24 at 520.
[d] Annealing Cycle: 24 hr. at 495, 24 at 515, 24 at 525.
[e] Calcium acetate

We claim:

1. An injection moldable blend comprising about 0.05 to 3.0 weight percent of calcium hydroxide or calcium acetate and an amorphous polyamide-imide polymer with inherent viscosities in the range of about 0.3 to about 3.0 measured at 25° C. and 0.5% w/v in 100 percent sulfuric acid comprising units of:

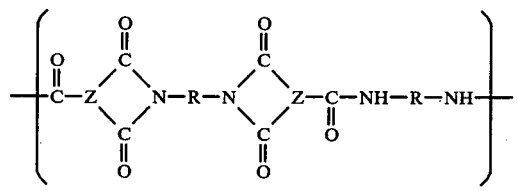

and units of:

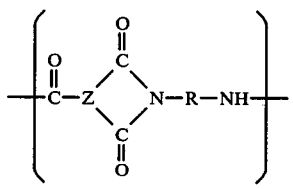

and units of:

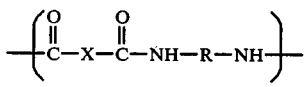

wherein "Z" is a trivalent benzene ring; R comprises $R_1$ or a mixture of $R_1$ and $R_2$, $R_1$ and $R_2$ are divalent aliphatic hydrocarbon radicals containing two to sixteen carbon atoms or are aromatic hydrocarbon radicals of from 6 to about 20 carbon atoms or two divalent hydrocarbon radicals of from 6 to 20 carbon atoms joined directly or by stable linkages selected from the group consisting of —O—, methylene, —CO—, —SO₂— and —S— radicals, and said $R_1$ and $R_2$ containing units run from about 10 mole percent $R_1$ containing units and 90 mole percent $R_2$ containing units to about 90 mole percent $R_1$ containing units to about 10 mole percent $R_2$ containing units and X is a divalent aromatic radical.

2. The copolymer of claim 1 wherein X and $R_1$ are

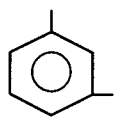

3. An injection moldable blend comprising about 0.05 to 3.0 weight percent of calcium hydroxide or calcium acetate and an amorphous polyamide-imide polymer with inherent viscosities in the range of about 0.3 to about 3.0 measured at 25° C. and 0.5% w/v in 100 percent sulfuric acid comprising units of:

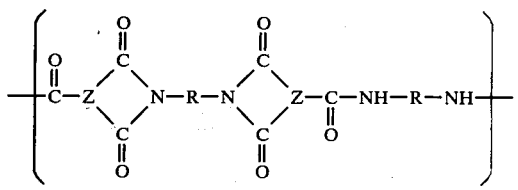

and units of:

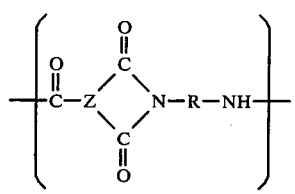

wherein "Z" is a trivalent benzene ring; R comprises a mixture of $R_1$ and $R_2$, $R_1$ and $R_2$ are divalent aromatic hydrocarbon radicals of from 6 to about 20 carbon atoms or two divalent hydrocarbon radicals of from 6 to 20 carbon atoms joined directly or by stable linkages selected from the group consisting of —O—, methylene, —CO—, —SO₂— and —S— radicals, and said $R_1$ and $R_2$ containing units run from about 10 mole percent $R_1$ containing units and 90 mole percent $R_2$ containing units to about 90 mole percent $R_1$ containing units to about 10 mole percent $R_2$ containing units.

4. A process for the preparation of injection moldable amorphous amide-imide and amide copolymers having an inherent viscosity of about 0.3 to 3.0 measured at 25° C. and 0.5% w/v in 100 percent sulfuric acid which continuous process comprises reacting fully or partially acylated diamines, where at least half of the diamines utilized in the reaction are acylated in the presence of $C_2$ through $C_8$ containing aliphatic anhydrides or acids, with aromatic tricarboxylic acid anhydrides, or mixtures of aromatic dicarboxylic acids and aromatic tricarboxylic acid anhydrides in a molar ratio of about 9:1 to 1:9 at a temperature of about 50° to 750° F., and wherein the molar ratio of the diamines to the anhydride or acid and anhydride mixture is 0.9:1 to 1.1:1 moles wherein 0.05 to 5 weight percent of calcium acetate or calcium oxide or calcium hydroxide have been added to the polymer.

5. The process of claim 4 wherein the aromatic dicarboxylic acid is isophthalic acid.

6. The process of claim 4 wherein the tricarboxylic acid anhydride compound is trimellitic anhydride.

7. The process of claim 4 wherein about 70 to 100 percent of the aromatic diamine is acylated.

8. The process of claim 4 wherein the acylated diamines are prepared from oxybisaniline and metaphenylene diamine.

9. The process of claim 8 wherein the molar ratio of the oxybisaniline to the metaphenylene diamine is in the range of about 8:2 to about 2:8 and wherein the calcium salt is calcium acetate.

10. A process for the preparation of injection moldable amorphous amide-imide and amide copolymers having an inherent viscosity of about 0.3 to 3.0 measured at 25° C. and 0.5% w/v in 100 percent sulfuric acid which continuous process comprises reacting fully or partially acylated diamines, where at least half of the diamines utilized in the reaction are acylated in the presence of $C_2$ through $C_8$ containing aliphatic anhydrides or acids, with aromatic tricarboxylic acid anhydrides, or mixtures of aromatic dicarboxylic acids and aromatic tricarboxylic acid anhydrides in a molar ratio of about 9:1 to 1:9 to which calcium oxide or calcium hydroxide or calcium acetate in the 0.05 to 5 weight percent range have been added, and wherein the molar ratio of the diamines to the anhydride or acid and anhydride mixture is 0.9:1 to 1.1:1 and wherein the reaction is conducted at a temperature of about 50° to 750° F.

11. The process of claim 10 wherein the aromatic dicarboxylic acid is isophthalic acid.

12. The process of claim 10 wherein the tricarboxylic acid anhydride compound is trimellitic anhydride.

13. The process of claim 10 wherein the acylated diamines are prepared from oxybisaniline and metaphenylene diamine.

14. The process of claim 10 wherein the molar ratio of the oxybisaniline to the metaphenylene diamine is in the range of about 8:2 to about 2:8 wherein the calcium salt is calcium acetate.

15. A continuous process for the preparation of injection moldable amorphous amide-imide and amide copolymers having an inherent viscosity of about 0.3 to about 3.0 measured at 25° C. and 0.5% w/v in 100 percent sulfuric acid which continuous process comprises reacting fully or partially acylated diamines, where at least half of the diamines utilized in the reaction are acylated in the presence of $C_2$ through $C_8$ containing aliphatic anhydrides or acids, with aromatic tricarboxylic acid anhydrides, or mixtures of aromatic dicarboxylic acids and aromatic tricarboxylic acid anhydrides in a molar ratio of about 9:1 to 1:9 at a temperature of about 50° to 750° F., and wherein the molar ratio of the diamines to the anhydride or acid and anhydride mixture is 0.9:1 to 1.1:1 wherein 0.05 to 5 weight percent of calcium salts of carboxylic acids or calcium hydroxide or calcium oxide have been added to the mixture of monomers prior to polymerization.

* * * * *